United States Patent
Feuster

(10) Patent No.: US 11,480,266 B2
(45) Date of Patent: Oct. 25, 2022

(54) WATER VALVE HEATER FOR FIRETRUCKS AND THE LIKE

(71) Applicant: WiSys Technology Foundation, Inc., Madison, WI (US)

(72) Inventor: Colin Feuster, Elk Mound, WI (US)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 374 days.

(21) Appl. No.: 16/738,702

(22) Filed: Jan. 9, 2020

(65) Prior Publication Data

US 2020/0224789 A1    Jul. 16, 2020

Related U.S. Application Data

(60) Provisional application No. 62/790,203, filed on Jan. 9, 2019.

(51) Int. Cl.
| | | |
|---|---|---|
| *F16K 49/00* | (2006.01) | |
| *A62C 27/00* | (2006.01) | |
| *B60K 25/02* | (2006.01) | |
| *A62C 35/68* | (2006.01) | |
| *F16K 27/06* | (2006.01) | |

(52) U.S. Cl.
CPC ........... *F16K 49/002* (2013.01); *A62C 27/00* (2013.01); *A62C 35/68* (2013.01); *B60K 25/02* (2013.01); *F16K 27/067* (2013.01); *Y10T 137/6606* (2015.04)

(58) Field of Classification Search
CPC ........ A62C 27/00; A62C 35/68; B60K 25/02; F16K 49/00; F16K 49/02; F16K 5/06; F16K 27/067; F16K 49/002; Y10T 137/6416; Y10T 137/6606
USPC ........... 137/334, 341, 343, 351, 355.12, 899
See application file for complete search history.

(56) References Cited

U.S. PATENT DOCUMENTS

| | | | | |
|---|---|---|---|---|
| 3,050,608 | A | * | 8/1962 | De Woody ............ F16K 49/002 219/547 |
| 4,447,706 | A | * | 5/1984 | Eder ........................ H05B 3/14 123/549 |
| 5,462,080 | A | * | 10/1995 | Plavidal ................ F16K 49/002 137/550 |
| 5,531,245 | A | * | 7/1996 | Sparks ................... F16K 49/002 137/341 |
| 5,639,394 | A | * | 6/1997 | Conley .................. F16K 27/067 219/535 |
| 6,141,497 | A | * | 10/2000 | Reinicke ................. B64G 1/402 244/164 |
| 9,399,151 | B1 | * | 7/2016 | Combs .................... A62C 37/00 |
| 2004/0170414 | A1 | * | 9/2004 | Kuebler ................. G05D 23/19 219/202 |
| 2004/0182370 | A1 | * | 9/2004 | Parkinson ............. F16K 49/002 123/549 |
| 2004/0250855 | A1 | * | 12/2004 | Hyde ................. G05D 16/0663 137/341 |

(Continued)

*Primary Examiner* — Kevin F Murphy
*Assistant Examiner* — Jonathan J Waddy
(74) *Attorney, Agent, or Firm* — Boyle Fredrickson, SC

(57) ABSTRACT

A heated water valve provides electrical resistance heaters placed within flange connections of the valve to provide for an integrated heater valve assembly with good heat conduction and spreading capabilities that can prevent water valve freezing at low temperatures.

10 Claims, 3 Drawing Sheets

(56) References Cited

U.S. PATENT DOCUMENTS

| | | | |
|---|---|---|---|
| 2005/0109771 A1* | 5/2005 | Bower | H05B 3/36 219/635 |
| 2006/0108383 A1* | 5/2006 | Byerly | F16J 15/064 222/504 |
| 2009/0095545 A1* | 4/2009 | Crabtree | F04B 1/26 180/53.8 |
| 2013/0105010 A1* | 5/2013 | McLoughlin | A62C 5/02 137/557 |
| 2013/0105182 A1* | 5/2013 | McLoughlin | G05D 9/12 137/101.25 |
| 2013/0253711 A1* | 9/2013 | McLoughlin | F04B 17/05 700/282 |
| 2015/0147054 A1* | 5/2015 | Green | F16K 49/002 392/449 |
| 2016/0177665 A1* | 6/2016 | Pollard | F16K 49/002 166/57 |
| 2019/0368633 A1* | 12/2019 | Sandiford | F16K 27/067 |
| 2020/0230452 A1* | 7/2020 | Kirchner | A62C 27/00 |

\* cited by examiner

WATER VALVE HEATER FOR FIRETRUCKS AND THE LIKE

CROSS REFERENCE TO RELATED APPLICATION

This application claims the benefit of U.S. provisional application 62/790,203 filed Jan. 9, 2019, and hereby incorporated by reference.

BACKGROUND OF THE INVENTION

The present invention relates generally to firefighting trucks and similar vehicles having water valves exposed to freezing environmental temperatures, and in particular to a heated water valve for maintaining the operability of these valves at critical times in cold weather.

Fire trucks or fire engines provide pressurized water for fighting fires, the water which may be sourced externally from a hydrant or a natural supply such as a lake or river, or in part or entirely from a storage tank on the fire truck. A pump on the fire truck, obtaining power from the fire truck engine, communicates with the storage tank and/or intake couplers receiving external water to provide pressurized water to output couplers communicating with the fire hoses. Typically, multiple output couplers will be provided to accommodate multiple fire hoses. Each output coupler has a valve such as a butterfly or ball valve used to block the flow of water when the output coupler is not used and positioned close to the coupler.

In the wintertime, water received from a hydrant or natural water source may be close to freezing temperatures. Onboard pump compartment heaters (applying heat to the pump tank and connecting plumbing) and recirculation of water through the tank by the pump help maintain this water in a liquid state. Nevertheless, the large thermal mass of the water passing through the system, and the high specific heat of water, limits the degree to which the water and pump equipment may be warmed.

In the low-temperature operating environment of the pumping equipment, water valves on the output couplers can become inoperable preventing access to critical water flow. The problem is compounded by the high thermal conductivity of the metal valve bodies which are directly exposed to cold air.

SUMMARY OF THE INVENTION

The present inventor has determined that electrical heating of a water valve using a heater associated with the water valve flange can significantly reduce freezing of outlet valves during cold weather use. The flange can provide either ample room for an embedded heater or a large interface area for an abutting heater "washer" while providing good heat conduction and heat-spreading to the other valve components that can freeze. Unlike heating "blankets" or tapes that are wrapped around equipment, an embedded heater can work with irregular valve shapes, does not interfere with valve usage, and is resistant to damage and water retention. Use of an electrical heating element allows relatively simple integration into existing fire truck systems without additional plumbing, new valves, extensive insulation, or the like.

Specifically then, in one embodiment, the invention provides a heated water valve having a valve body with a flow channel between an inlet opening and outlet opening, the valve body including at least one flange providing a metal plate extending radially outward around one of the inlet opening and outlet opening and communicating with the flow channel, the metal plate bounded by peripheral walls and supporting multiple flange through-holes in the metal plate around the one of the inlet opening and outlet opening. A valve operator is positioned in the channel to move between a first position allowing flow through the channel and a second position blocking flow through the channel and at least one electrical resistance heater fitted within at least one bore through the metal plate to conduct heat into the metal flange, the electric heater having a capacity of at least 200 watts.

It is thus a feature of at least one embodiment of the invention to provide heated valve that makes use of the material of the flange to provide a protected location for an electrical resistance heater. By providing an incorporated heater, cumbersome heating blankets that are prone to damage or that interfere with valve operation or hose coupling are eliminated and irregular valve shapes accommodated.

The metal plate may have an axial thickness perpendicular to its radial extent of least one-half inch.

It is thus a feature of at least one embodiment of the invention to provide for good heat spreading of the heat of the electrical resistance heater.

The valve body may have a thermal conductivity no less than that of brass.

It is thus a feature of at least one embodiment of the invention to permit a heater to be displaced from the valve components in the flange while providing good heating of those valve components.

The openings may each have an area greater than four square inches.

It is thus a feature of at least one embodiment of the invention to provide a heater suitable for high-capacity valves of the type used in firetrucks and the like. The present inventor has determined that valve freezing can be prevented even in high-capacity valves using this technique despite rapid cooling that can occur with flowing water and exposure of the valve body to frigid air.

The electric heater resistant heater may be a cartridge heater providing a sealed metal sleeve holding an electrical resistance element separated from the metal sleeve by an electrical insulator.

It is thus a feature of at least one embodiment of the invention to provide the ability to use field-tested high wattage cartridge heaters that provide a narrow form factor that may be introduced into standard valve plumbing.

The heated water valve may include two bores in the metal plate extending along its radial extent and positioned to flank the at least one of the inlet opening and outlet opening.

It is thus a feature of at least one embodiment of the invention to provide ample heater total wattage while still enclosing the heater within a narrow metal plate.

The first and second bores may diverge from a common entry cavity in a peripheral wall of the metal plate.

It is thus a feature of at least one embodiment of the invention to provide a robust single point electrical connection to the heater reducing interference in the installation of the heater onto a valve system.

The valve heater may further include a temperature sensor communicating with the metal plate and a thermostatic controller receiving a signal from the temperature sensor to switch electrical power to the heater element to provide a temperature of at least 100 degrees Fahrenheit.

It is thus a feature of at least one embodiment of the invention to provide temperature limiting permitting high wattage heaters to operate without risk of damage to the heaters at warmer temperatures or when chilled water is not present.

In one embodiment, the metal plate may provide a first plate portion integral with the flow channel and a second plate portion abutting the first plate portion to thermally communicate with the first plate portion along a radially extending interface.

It is thus a feature of at least one embodiment of the invention to provide a modular heater system that can make use of pre-existing flange-type valves and that can be introduced into an existing fire truck or the like with minimum disruption.

The radially extending interface may provide a contact area between the first plate and second plate of at least 10 square inches.

It is thus a feature of at least one embodiment of the invention to promote a high degree of thermal communication between the heater and other valve components in a modular type heater. By transferring heat through the flange surface normally used to provide mechanical connection, high thermal transfer can be obtained from a modular design.

At least one of the first and second faces may provide a groove for receiving an elastomeric seal surrounding the central plate opening.

It is thus a feature of at least one embodiment of the invention to introduce a heater before the valve that can resist leakage under high pressures experienced on that side of the valve.

These particular objects and advantages may apply to only some embodiments falling within the claims and thus do not define the scope of the invention.

DETAILED DESCRIPTION OF THE PREFERRED EMBODIMENT

Figure 1:
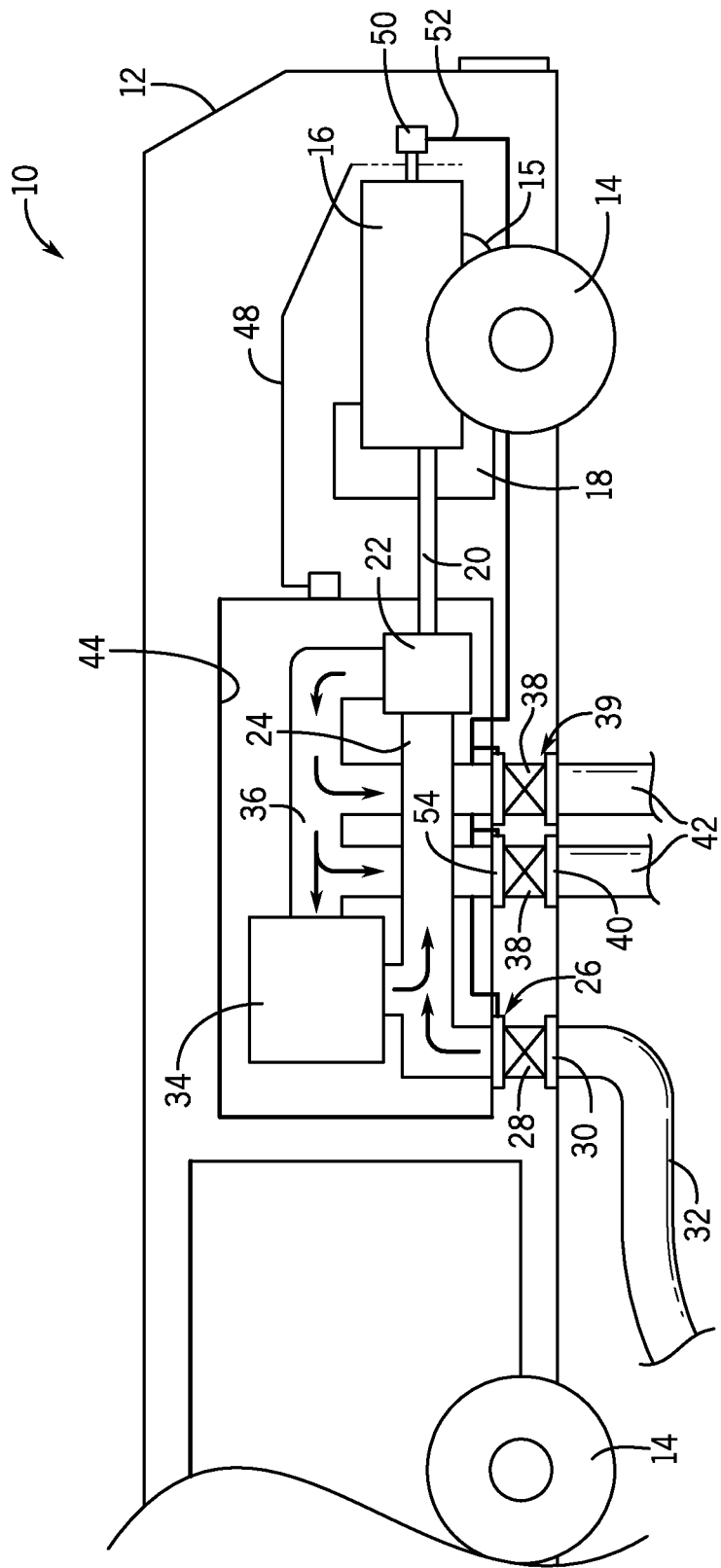
FIG. 1 is a schematic representation of a fire truck showing components of the fire truck engine providing communication among a pump, a tank, and inlet and outlet valves.

Referring now to FIG. 1, a fire truck 10 suitable for use with the present invention may provide for a chassis 12 supported for movement on wheels 14, the wheels communicating through a standard transmission drive system 15 with a vehicle engine 16, for example, the latter internal combustion engine receiving fuel from a fuel tank 18.

The engine 16 of the fire truck 10 may communicate via a driveshaft 20 with a pump 22 such as a centrifugal pump having an inlet pipe 24 communicating with one or more water inlets 26 having inlet valves 28 and hose couplings 30 to connect the inlets 26 with intake hoses 32, the latter capable of receiving water from a hydrant, lake, river, or the like.

The inlet pipe 24 to the pump 22 may also communicate with a water storage tank 34 providing an accumulator for water or in some cases may be used in lieu of a source of water received through the inlet hose 32.

An outlet pipe 36 from the pump 22 may pass to the tank 34 in a recirculation mode and also to water outlets 39 providing outlet valves 38 communicating with hose couplings 40 to attack lines 42 delivering water to nozzles that may direct water at a burning structure under the guidance of firemen.

The tank 34, pump 22, outlet pipe 36, and inlet pipe 24, may generally be held in a pump compartment 44 that may receive heated air from a heater shroud 48 scavenging waste heat from the engine 16 or the like.

The engine 16 may communicate with an alternator generator 50 which in the present invention may communicate switched electricity through electrical lines 52 to valve heaters 54 on the inlet valves 28 and outlet valves 38 per the present invention.

Figures 2, 3:
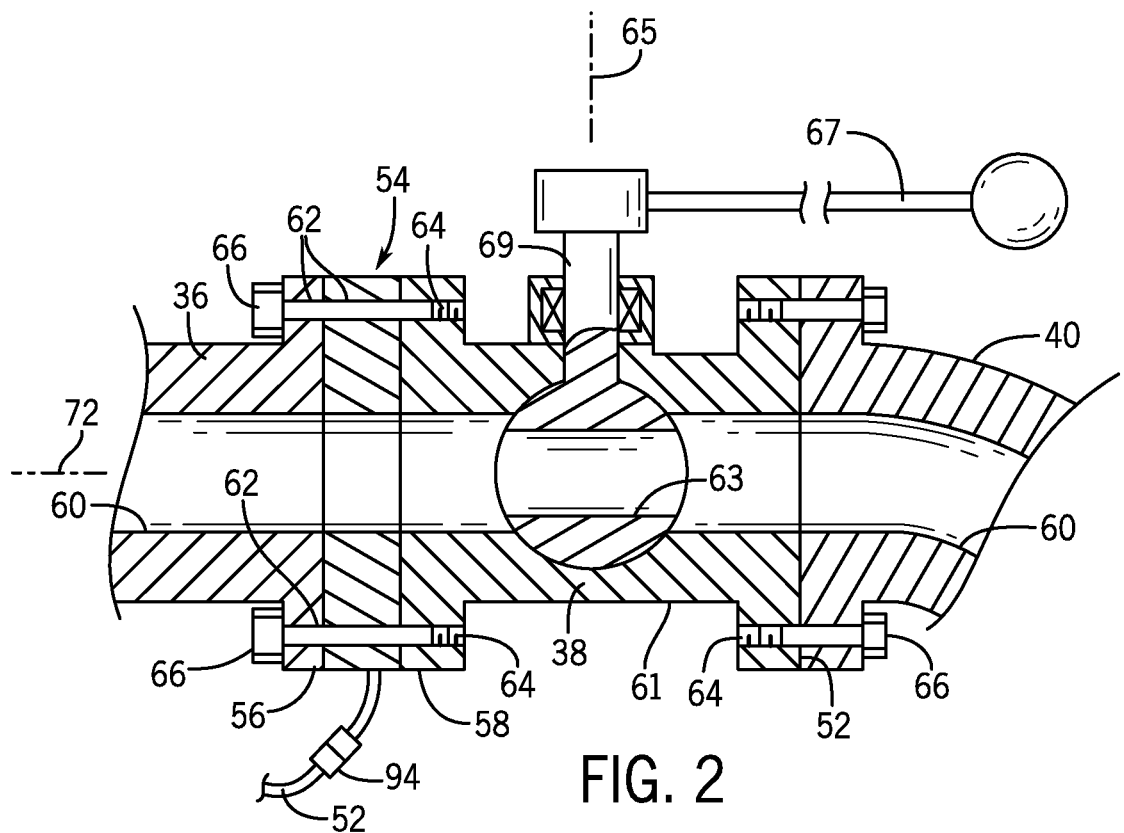
FIG. 2 is an elevational cross-sectional view through a valve of FIG. 1 showing a modular heater of the present invention sandwiched between a flange of a valve outlet pipe and a valve flange of a valve connected to the hose coupling.
FIG. 3 is a perspective view of the modular heater of FIG. 2.

Referring now also to FIGS. 2 and 3, generally the outlet pipe 36 and the inlet pipe 24 (at the water inlet 26 and water outlet 39) will terminate at a flange 56 presenting a flat surface extending radially and generally perpendicular to an axis of a channel 60 of water flow. The flange 56 is sized to be bolted to a corresponding flange 58 on the valve 38 to provide a continuous connection between the channel 60 of the outlet pipe 36 and a corresponding channel 60 of the valve 38. Exposed broad radial faces of the flanges 56 and 58 abut each other and may be generally square with bolt hole bores 62 or corresponding threaded bolt holes 64 that align at the corners of the flanges 56 and 58 and that may receive bolts 66 therethrough to attach flanges 56 and 58 together in a watertight configuration.

The channel 60 of the valve 38 is formed in a valve body 61 that may be formed, for example, as cast bronze or other highly conductive metal and provides an integrated connection of the flange 58 and a flange 59 (generally a mirror image of flange 58) at the opposite end of the channel 60. Generally the channel 60 will pass through the flanges 58 and 59 along an axis 72 perpendicular to the exposed outer broad faces of the flanges 58 and 59 and will have a circular cross-section of at least 2.5 inches in diameter; however, the invention is also suitable for valves having a one-inch diameter and as much as 5 to 6 inches in diameter.

Positioned within the channel 60 of the valve 38 is a valve operator 63, in this case a ball, having a central channel that may be rotated around an operator axis 65 by a manual operator 67 accessible by firefighters by means of a shaft 69. Rotation of the operator 63 serves to open and close the channel 60 according to techniques well known in the art.

In one embodiment of the present invention, the flanges 56 and 58 are separated by the heater 54 providing a body plate 68 having an outer square periphery 71 matching the perimeter of the flanges 56 and 58 and defining peripheral edges of two opposed parallel planar faces 73 of the body plate 68. The body plate 68 includes a centered circular bore 70 corresponding to the cross-section of the channel 60 and surrounding bores 62 at regular angular separation about a center of the body plate 68 and the circular bore 70 sized to allow free passage of the bolts 66 that would connect flanges 56 and 58. As noted, when assembled, central circular bore 70 of the body plate 68 may align with the channel 60, and the bores 62 may align with the bores 62 of the flange 56 and the threaded holes of the flange 58. When the body plate 68 is sandwiched between flanges 56 and 58 so that bolts 66 may compress the body plate 68 faces 73 between the corresponding surfaces of the flanges 56 and 58 that would otherwise abut.

The body plate 68 in one embodiment may be formed of one-half inch or ⅝ inch thick 6061 aluminum measured along an axis of the bore 70. Each side of the square periphery 71 of the body plate 68 may be, for example, five inches in length. In one embodiment, the contact area between faces of the body plate 68 and the respective flanges 56 and 58 will be at least 15 square inches for good thermal communication between these elements. A shallow groove 76 may be cut into one or both faces 73 of the body plate 68 concentric with the bore 70 to receive an O-ring or similar type seal.

Preferably the body plate 68 has a high thermal conductivity greater than or equal to brass and above 64 BTUs per hour foot degree Fahrenheit, and thus the body plate 68 may be fabricated out of brass, aluminum, or copper.

Figure 4:
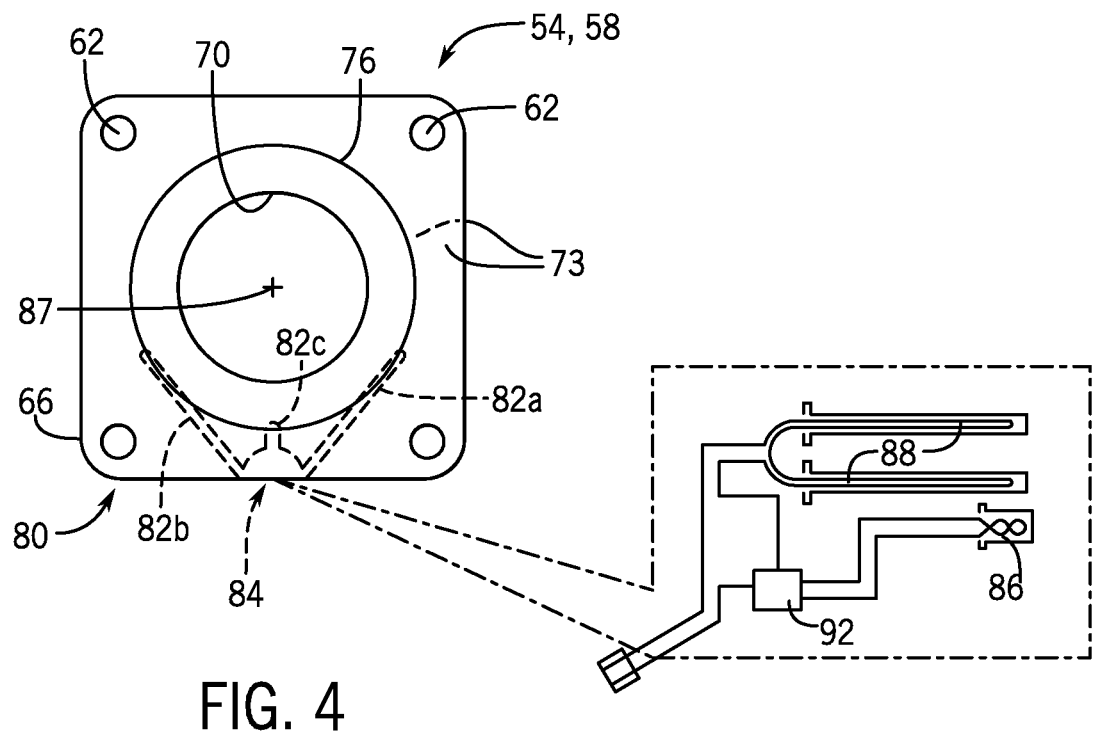
FIG. 4 is a elevational phantom view of the heater of FIG. 3 showing placement of heater cartridges and a thermocouple in an integrated or two-part valve flange together with an electrical schematic indicating their intercommunication.

Referring now to also to FIG. 4, a lower face 80 of the radial outward periphery of the body plate 68 extending generally parallel to the channel 60 may receive three blind bores 82a-82c starting at a concave opening 84 centered on face 80. Each of the bores 82a-82c may lie within a plane bisecting the planes defined by the external faces 73 of the body plate 68. Bore 82c may extend generally into the body plate 68 aligned with a center 87 of the bore 70, and bores 82a and 82b may diverge on either side of bore 82c from opening 84 and each be separated by 45 degrees from the extent of bore 82c but lying in the same plane and passing on opposite sides of the bore 70.

Bore 82c may receive a thermocouple 86 whereas each of bores 82a and 82b may receive electrical resistance heaters 88. These electrical resistance heaters 88 may be cartridge heaters of a type including electrical resistance wire such as nichrome wire spiraling along an axis of the cartridge heater and covered with an insulation. The insulated electrical resistance wire is then sealed within a tubular cylindrical sheath which may be filled with a thermally conductive potting such as magnesium oxide to provide close thermal communication between the electrical resistance wire and the metal of the body plate 68 to heat the same. Each cartridge heater may have a wattage of at least 200 watts.

Generally, the two electrical resistance elements 88 may be wired in series (as shown) or in parallel to connect with electrical leads 90 forming part of electrical lines 52. In one embodiment, leads 90 may be potted within the opening 84 to provide strain relief and protection against the ingress of water or the like. In one embodiment, the electrical resistance elements may be self regulating, for example, using positive temperature coefficient resistances. In the depicted embodiment, however, the electrical leads 90 are connected in series with a thermostat 92 which also communicates with the thermocouple 86 to cycle electricity through the electrical resistance heaters 88 according to the thermocouple signal from thermocouple 86 to maintain the operating temperature of 100-120° F. Lower temperatures within this range may be suitable for smaller valves (e.g., 1-2,5" diameter channels 60) while an operating temperature of 115-140° F. may be suitable for larger valves (e.g., 5-6" diameter channels 60). Using either of these regulation techniques, electrical power is not consumed except as needed to maintain valve temperature allowing high wattage heaters to be used without risk of overheating. Generally, the heater elements will provide for a heat output of at least 500 watts and preferably 100 watts readily handled by vehicle wiring systems running at 12 volts.

Referring again to FIG. 3, electrical lines 52 may include an electrical connector 94 that may be releasably connected to communicate with electrical lines 52 for ease of installation.

Figure 5:
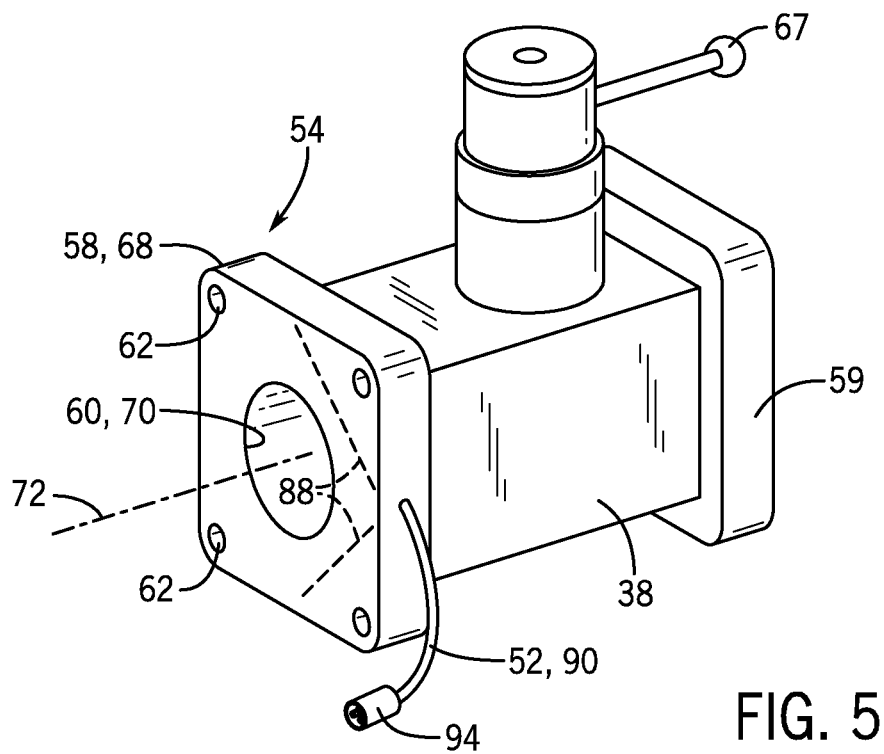
FIG. 5 is a perspective view of a valve of FIG. 2 having an integrated heater within the valve flange.

Referring now to FIG. 5, it will be appreciated that the body plate 68 may be integrated with either of the flanges 58 and 59 of the valve 38 so that the electrical heater elements 88 fit within an integral valve body casting, potentially reducing the combined thickness of the flange 58 and body plate 68 (in one embodiment) and simplifying installation and maintenance.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A fire truck comprising:
a truck chassis providing a drivetrain communicating with truck wheels and a water pump;
an engine providing power to the drivetrain communicating with the truck wheels and the water pump;
a water tank communicating with the water pump to provide water to the water pump and to receive water from the water pump;

at least one water inlet communicating with the water pump to provide water to the water pump;

at least one water outlet communicating with the water pump to receive pressurized water from the water pump, wherein the water outlet provides a first attachment flange providing a set of outlet flange bolt holes surrounding an outlet channel within the first attachment flange;

a valve heater having:

(a) a metal plate providing an opposed first and second face having a central plate opening and multiple plate holes around the central plate opening, the first face sized to abut and be bolted to the first attachment flange of the outlet with the central plate opening aligned with the outlet channel and the multiple plate holes aligned with outlet flange bolt holes; and (b) an electric heater having a capacity of at least 200 watts in thermal communication with the metal plate to heat the metal plate;

a water valve providing a second attachment flange providing a set of valve flange bolt holes surrounding a valve channel within the second attachment flange and sized to abut and be bolted to the second face of the metal plate with the central plate opening aligned with the valve channel and the multiple valve flange bolt holes aligned with the multiple plate holes; and a hose coupler attached to the water valve to receive water from the valve channel when the water valve is open.

2. The fire truck of claim 1 wherein the metal plate has an axial thickness perpendicular to its radial extent of at least one-half inch.

3. The fire truck of claim 2 wherein the valve channel communicates between an inlet opening and an outlet opening and wherein the inlet opening and outlet opening each have an area greater than four square inches.

4. The fire truck valve of claim 3 wherein the electric heater is a cartridge heater providing a sealed metal sleeve holding an electrical resistance element separated from the metal sleeve by an electrical insulator.

5. The fire truck valve of claim 3 including first and second bores in the metal plate extending along its radial extent and positioned to flank the at least one of the inlet opening and outlet opening, each bore holding an electrical resistance element.

6. The fire truck valve of claim 5 wherein the first and second bores diverge from a common entry cavity in a peripheral wall of the metal plate.

7. The fire truck valve of claim 3 further including:

a temperature sensor communicating with the metal plate; and a thermostatic controller receiving a signal from the temperature sensor to switch electrical power to the electric heater to provide a regulated temperature of the metal plate of at least 100 degrees Fahrenheit.

8. The fire truck valve of claim 1 wherein the metal plate provides a first plate portion integral with the valve channel and a second plate portion abutting the first plate portion to thermally communicate with the first plate portion along a radially extending interface; and wherein the electric heater is positioned in the second plate portion.

9. The fire truck valve of claim 8 wherein the radially extending interface provides a contact area between the first plate portion and second plate portion of at least 10 square inches.

10. The fire truck valve of claim 9 wherein the valve channel communicates between an inlet opening and an outlet opening and wherein the metal plate provides a groove around the at least one of the inlet opening and outlet opening for receiving an elastomeric seal.

\* \* \* \* \*